(12) United States Patent
Rijhsinghani et al.

(10) Patent No.: US 6,526,052 B1
(45) Date of Patent: Feb. 25, 2003

(54) VIRTUAL LOCAL AREA NETWORKS HAVING RULES OF PRECEDENCE

(75) Inventors: Anil Rijhsinghani, Westborough, MA (US); Henry S. Yang, Andover, MA (US)

(73) Assignee: Enterasys Networks, Inc., Rochester, NH (US)

( * ) Notice: Subject to any disclaimer, the term of this patent is extended or adjusted under 35 U.S.C. 154(b) by 0 days.

(21) Appl. No.: 09/221,333

(22) Filed: Dec. 23, 1998

(51) Int. Cl.⁷ ............................................... H04L 12/28
(52) U.S. Cl. .................................. 370/389; 370/395.53
(58) Field of Search ................................. 370/400–403, 370/395.1, 395.5, 395.53, 396, 398, 389; 709/227, 230

(56) References Cited

U.S. PATENT DOCUMENTS

| | | | |
|---|---|---|---|
| 4,975,906 A | 12/1990 | Takiyasu et al. | |
| 5,218,603 A | 6/1993 | Watanabe | |
| 5,394,402 A * | 2/1995 | Ross | 370/402 |
| 5,473,608 A | 12/1995 | Gagne et al. | |
| 5,500,860 A | 3/1996 | Perlman et al. | 370/85.13 |
| 5,619,495 A | 4/1997 | Yamanaka et al. | |
| 5,684,800 A * | 11/1997 | Dobbins et al. | 370/401 |
| 5,734,824 A | 3/1998 | Choi | 395/200.11 |
| 5,751,967 A * | 5/1998 | Raab et al. | 709/220 |
| 5,752,003 A | 5/1998 | Hart | |
| 5,796,740 A | 8/1998 | Perlman et al. | 370/401 |
| 5,825,772 A * | 10/1998 | Dobbins et al. | 370/396 |
| 5,838,677 A | 11/1998 | Kozaki et al. | |
| 5,878,232 A | 3/1999 | Marimuthu | |
| 5,889,762 A | 3/1999 | Pajuvirta et al. | 370/230 |
| 5,892,912 A * | 4/1999 | Suzuki et al. | 370/395.53 |
| 5,949,783 A | 9/1999 | Husak et al. | |
| 5,959,989 A | 9/1999 | Gleeson et al. | |
| 5,959,990 A | 9/1999 | Frantz et al. | 370/392 |
| 5,963,556 A | 10/1999 | Varghese et al. | |
| 5,987,522 A | 11/1999 | Rijhsinghani | |
| 6,014,380 A | 1/2000 | Hendel et al. | |
| 6,023,563 A | 2/2000 | Shani | 395/200 |
| 6,047,325 A | 4/2000 | Jain et al. | |
| 6,085,238 A * | 7/2000 | Yuasa et al. | 370/409 |
| 6,111,876 A | 8/2000 | Frantz et al. | 370/392 |
| 6,112,251 A | 8/2000 | Rijhsinghani | |
| 6,128,655 A | 10/2000 | Iturralde | 709/238 |
| 6,157,647 A | 12/2000 | Husak | |
| 6,185,214 B1 * | 2/2001 | Schwartz et al. | 370/389 |
| 6,188,691 B1 | 2/2001 | Barkai et al. | |
| 6,301,224 B1 | 10/2001 | Rijhsinghani | |

FOREIGN PATENT DOCUMENTS

| | | |
|---|---|---|
| EP | 0 860 958 A | 8/1998 |
| WO | WO 00/39966 A1 | 6/2000 |

OTHER PUBLICATIONS

International Search Report—PCT/US99/30712.
Anderson J.K., "Virtual LANS Take Network To Next Level," Computer Technology Review, U.S. Westworld Production Co., Los Angeles, vol. 16, No. 9, Sep. 1, 1996.

* cited by examiner

*Primary Examiner*—David Vincent
(74) *Attorney, Agent, or Firm*—Wolf, Greenfield & Sacks, P.C.

(57) ABSTRACT

A switch for use in a communications system having multiple local area networks interconnected by multiple switches so as to be configurable into different types of virtual local area networks includes first and second communication ports. The first communication port is connected directly to a local area network and the second communication port interconnects with other system switches. A switch control detects a communication from the local area network and identifies a virtual local area network over which the communication is to be transmitted based upon rules of precedence for different types of virtual local area networks. The communication is appended with a VLAN tag representing the identified virtual local area network so as to form a VLAN communication that is directed to the second communication port for transmission over the identified virtual local area network.

36 Claims, 11 Drawing Sheets

PORT AND PROTOCOL-BASED ← HIGHEST

OVER

PORT-BASED

OVER

ADDRESS AND PROTOCOL-BASED

OVER

ADDRESS-BASED

OVER

PROTOCOL-BASED ← LOWEST

*FIG. 11*

VIRTUAL LOCAL AREA NETWORKS HAVING RULES OF PRECEDENCE

BACKGROUND OF THE INVENTION

1. Field of the Invention

The present invention relates generally to communications networks and more particularly to communications systems having various types of virtual local area networks and established rules of precedence for matching a communication packet with a particular virtual local area network.

2. Discussion of the Related Art

Local area networks (LANs) are used to facilitate communications between a number of users. Individual LANs may be bridged together to allow a larger number of users to communicate amongst themselves. These bridged LANs may be further interconnected with other bridged LANs using routers to form even larger communications networks.

FIG. 1 depicts an exemplary interconnected bridged LAN system. The numerals 10, 20, 30, etc., are used to identify individual LANs Bridges between LANs are designated by the numerals 5, 15, 25 and 35. A router between bridged LAN 100 and bridged LAN 200 is identified with the reference numeral 300. In the bridged LAN system depicted, a user A is able to communicate with a user B without leaving the LAN 10. If user A desires to communicate with user C in LAN 20 or user D in LAN 30, the communication is transmitted via bridges 5 and 15.

If user A desires to communicate with user E, the communication must be routed via router 300 to bridged LAN 200. As will be understood by those skilled in the art, bridges operate at layer 2 of the OSI network model and transparently bridge two LANs. It is transparent to users A and C that communications between them are ported over bridge 5 because layer 2 bridges do not modify packets, except as necessary to comply with the type of destination LAN. However, if user A wishes to communicate with user E, the communication must be ported via router 300 which operates at level 3 of the network model. Accordingly, communications over routers flow at a much slower rate than communications over a bridge, and, therefore communications are regulated by the routers.

Therefore, LAN network administrators generally attempt to connect together those users who frequently communicate with each other in bridged LANs. However, if the bridged LAN becomes too large, it becomes unscalable and may experience various well-known problems. Accordingly, routers are used to interconnect bridged LANs so that the bridged LANs themselves can be kept to an acceptable size. This results in delays in communications between users which are transmitted via the router 300. If, for example, in FIG. 1, user E and user A need to communicate frequently, it would be advantageous to interconnect LAN 10 and LAN 50 via a bridge rather than the router 300. This would require the rewiring of the system which is costly and may be impracticable under many circumstances, such as, if users A and E will only need to frequently communicate for a limited period of time.

Virtual LANs (VLANS) have recently been developed to address the deficiencies in interconnected bridged LAN systems of the type depicted in FIG. 1. VLANs allow LANs to be bridged in virtually any desired manner, i.e., independent of physical topology, with switches operating at layer 2. Hence, the switches are transparent to the user. Furthermore, the bridging of LANs can be changed as desired without the need to rewire the network. Because members of one VLAN cannot transmit to the members of another VLAN, a firewall is effectively established to provide security which would not be obtainable in a hardwired interconnected bridged LAN system. Accordingly, VLAN systems provide many advantages over interconnected bridged LANs.

For example, as shown in FIG. 2, individual LANs 10, 20, 30, 40, 50, 60, 70, 80, 90 (10–90) are interconnected by layer 2 switches 5', 15', 25', 35', 45', (5'–55'). A network management station (NMS) 290 controls the interconnection of the individual LANs such that LANs can be easily bridged to other LANs on a long term or short term basis without the need to rewire the network. As depicted in FIG. 2, the NMS 290 has configured two VLANs by instructing, e.g., programming, and thereby configuring the switches 5'–55' such that LANs 10–60 are bridged together by switches 5', 15', 55', 35' to form VLAN 100' and LANs 70–90 are bridged together by switches 45' and 55' to form VLAN 200'. This is possible because, unlike the bridges 5–35 of FIG. 1, which include only two ports, and accordingly are able to only transfer information from one LAN to another LAN, the switches 5'–55' are multi-ported and programmable by the NMS 290 such that the network can be configured and reconfigured in any desired manner by simply changing the switch instructions.

As shown in FIG. 2, the switch 55' has been instructed to transmit communications from user A of LAN 10 to user E of LAN 50, since both users are configured within VLAN 100'. User A, however, is not allowed to communicate with users H or F since these users are not configured within the VLAN 100' user group. This does not, however, prohibit users F and H, both of whom are members of VLAN 200', from communicating with one another via switches 45' and 55'.

If it becomes desirable to change the network configuration, this is easily accomplished by issuing commands from NMS 290 to the applicable switches 5'–55'. For example, if desired, user H could be easily added to VLAN 100' by simply reconfiguring VLAN 100' from the NMS 290. The NMS 290 issues an instruction to switch 55', instructing switch 55' to allow communications to flow between users A–D and E and user H via switch 55', i.e., to include LAN 90 in VLAN 100' and remove it from VLAN 200'.

Because the switches 5'–55' are layer 2 switches, a bridge formed by the switch is transparent to the users within the VLAN. Hence, the transmission delays normally associated with routers, such as the router 300 of FIG. 1, are avoided. The flexibility of the VLAN lies in its' ability to have its' network configuration controlled through software on the NMS 290. More particularly, in accordance with its' programmed instructions, the NMS 290 generates and transmits signals to instruct the switches 5'–55' to form the desired VLAN configurations.

In a conventional LAN protocol, a communication packet 400, as shown in FIG. 3, includes a destination address 118 having six bytes, a source address 116, and message data 112. The packet 400 also includes an indication of the applicable LAN protocol identifier 114.

FIG. 5 is a schematic of a conventional VLAN system. The VLAN system includes LANs 205–260 which are connected by switches 270–280 to a high-speed LAN backbone or trunk 265. An NMS 290 is interconnected to the switches 270–280 via LAN 260. The NMS 290 is interconnected via LAN 260 as an example and could be interconnected to switches 270–280 via any of the LANs 205–260. A trunk station 285 is connected to the high-speed LAN backbone 265 via a trunk port 315. The LANs 205–215, and 230–235 have designated members F–J. LANs connect to each of the switches 270–280 by a plurality of access ports 305. For example, switch 270 is connected via access ports 305 to LANs 205–220.

Each switch is capable of interconnecting a LAN connected via an access port 305 with another LAN connected via an access port 305. For example, switch 270 can be instructed by the NMS 290 to interconnect LAN 205 to LAN 215 by configuring a VLAN including LANs 205 and 215, thereby enabling communications between members F and H.

Each switch is also capable of interconnecting a LAN connected by an access port 305 with a LAN connected to another switch by an access port 305 via high-speed LAN backbone 265. For example, Switches 270 and 275 can be instructed by the NMS 290 to interconnect LANs 205 and 230 by configuring a VLAN including LANs 205 and 230, thereby enabling communications between member E of LAN 205 and member I of LAN 230.

FIG. 4 depicts a VLAN communications packet 400' which is similar to the LAN communications packet 400 depicted in FIG. 3, except that a VLAN header has been added to the packet. The VLAN header is added by the initial switch to which the message packet is directed. The VLAN header identifies the resulting packet as a "VLAN" or "tagged" packet, and represents the particular VLAN from which the packet originated. The VLAN header, as shown, includes a destination address 126 which is the same address as the destination address 118, a source address 124 which is the same as source address 116, a protocol identifier 122, and a VLAN tag 120 identifying the applicable VLAN.

For example, if LANs 205, 220 and 230 of FIG. 5 are within a single VLAN and member E of LAN 205 desires to communicate with member I of LAN 230, the message 400 of FIG. 3 is directed to access port 305 of the switch 270. The switch determines, based upon instructions previously received from the NMS 290, that the LAN 205 falls within the applicable VLAN and, accordingly, adds the appropriate VLAN header to the packet to form packet 400', as shown in FIG. 4. The packet 400' is then directed via trunk port 315 to the high-speed backbone LAN 265 and detected by switches 275 and 280.

Because switch 280 lacks any access ports connected to LANs within the applicable VLAN, switch 280 discards the packet 400'. Switch 275, however, identifies the VLAN header of packet 400' as associated with a VLAN which includes LAN 230. The switch 275 accordingly removes the VLAN header and directs the packet, which now appears as packet 400 of FIG. 3, to LAN 230 over which the member I receives the message.

Many trunk stations, such as trunk station 285, are incapable of recognizing VLAN headers. Further, since no programmable switch is disposed between a trunk station and the trunk, communications, i.e. packets, with a VLAN header will be ignored and/or discarded by the trunk station. Hence, in a conventional VLAN system, such as that shown in FIG. 5, the trunk stations, e.g., trunk station 285, form part of a default group.

The default group is a group of system users or end stations not within any VLAN. For a communication packet sent by a system user within the default group, the initial switch to which the packet is directed determines that the system user does not fall within any VLAN, and consequently does not add a VLAN header.

The NMS 290 of the system shown in FIG. 5 is capable of configuring different types of VLANs as is understood by those skilled in the art. For example, VLANs may be port-based, address-based, protocol-based, port and protocol-based, or address and protocol-based. When the NMS 290 configures a VLAN, the NMS instructs the appropriate switches to identify the VLAN for packets received at the switch. Identifying the appropriate VLAN for a packet enables the switch to transmit the packet over the appropriate VLAN.

For a port-based VLAN, the NMS configures the VLAN to include LANs connected at certain access ports 305 of certain switches. The NMS instructs each certain switch to identify the VLAN for a packet based upon the access port at which the packet is received.

For an address-based VLAN, the NMS configures the VLAN to include certain addresses. If a switch is connected to a LAN at an access port 305 that includes one of the certain addresses, the NMS instructs the switch to identify the VLAN for a packet when received at the access port based upon the source address 116 included in the packet.

For a protocol-based VLAN, the NMS 290 configures the VLAN based upon a system user's ability to transmit and receive communications following a particular protocol, whether that protocol is proprietary or open. The NMS instructs the switches to identify the VLAN based upon the protocol identifier 114 included in the packet received at an access port 305.

For port and protocol-based VLANs, the NMS 290 instructs the switches that include certain access ports to identify the VLAN for a packet based upon the access port at which the packet is received and the protocol identifier 114 included in the packet received. For address and protocol-based VLANs, the NMS 290 instructs the switches connected to certain addresses to identify the VLAN for the packet based on the source address 116 and the protocol identifier 114 included in the packet.

FIG. 6 depicts a system with various LANs 205–260 configured into a number of different types of VLANs 800–1200 by the NMS 290 in a conventional manner. VLAN 800 is a port-based VLAN including LANs 210, 235, and 240. VLAN 900 is an address-based VLAN including addresses K, V, L, N, U, Q, R, S, and T. VLAN 1000 is a protocol-based VLAN including protocol P1. Protocol-based VLAN 1000 is not explicitly depicted in FIG. 6 because any packet may be identified with VLAN 1000 if the packet includes a protocol identifier for protocol P1. As the name "protocol-based" implies, VLAN 1000 is independent of the address of the system user, or the port connected to the LAN on which the system user resides. VLAN 1100 is a port and protocol-based VLAN including LANs 235, 240, 245, and 250 and protocol P1. Finally, VLAN 1200 is an address and protocol-based VLAN including addresses K, L, M, U, Q, T and protocol P1.

The depiction of VLANs 100 and 1200 in FIG. 6 is for description purposes only because the VLAN is also determined by the protocol P1. For a packet transmitted from one of the LANs 235–250 to be identified with port and protocol-based VLAN 1100, the packet must include a protocol identifier for protocol P1. Similarly, for a packet transmitted from one of the addresses K, L, M, U, Q, or T to be identified with address and protocol-based VLAN 1200, the packet must include a protocol identifier for protocol P1. LANs 1100 and 1200 are depicted as such in FIG. 6 to illustrate the configuration of different types of VLANs.

As can be seen from the system of FIG. 6, some of the VLANs overlap. For example, a packet transmitted from address K will be identified with address-based VLAN 900, and port-based VLAN 800 because address K resides on LAN 210, which is included in VLAN 800. Furthermore, if a packet transmitted from address K includes a protocol identifier for protocol P1, the packet may be identified with VLAN 1000. Another example of overlap affects packets transmitted from LAN 240 which will be identified with port-based VLAN 800 and may be also identified with protocol-based VLAN 1000 and port and protocol-based VLAN 1100 if the packet includes a protocol identifier for protocol P1. The problems associated with overlap are discussed below.

In view of the different types of VLANs, each of the switches 270–280 must be programmed to consider all of the various communications characteristics which are necessary to associate a communication packet received at an access port. For example, switch 270 is programmed to consider the port, the address, as well as the protocol to determine if a communication received via one of its access ports should be tagged with a VLAN header representing VLAN 800, 900, 1000, or 1200. Switch 275 must be programmed to consider the port, the address, and the protocol to determine if a communication received via one of its access ports should be tagged with a VLAN header representing VLAN 800, 900, 1000, 1100, or 1200. Switch 280 must be programmed to consider the port, the address, and the protocol to determine if a communication received via one of its access ports should be tagged with a VLAN header representing VLAN 900, 1000, 1100, or 1200.

In each case presented above, it should be noted that switches must be programmed to consider some characteristics jointly. For example, switches 270 and 280 must be programmed to consider jointly the address and protocol to ensure that communications received from address K or addresses Q and T are properly tagged with a VLAN header representing VLAN 1200. Switches 275 and 280 must be programmed to consider jointly the port and protocol to ensure that communications received from LANs 235 and 240, or 245 and 250, respectively, are properly tagged with a VLAN header representing VLAN 1100.

Although it is known to configure different types of VLANs within a VLAN system based upon characteristics such as those previously described, problems arise in attempting to implement such systems. More particularly, under certain circumstances, overlap of VLANs may occur such as depicted in FIG. 6. Overlap occurs when a communication packet received at a switch can be identified with more than one VLAN. When overlap occurs, a switch may become confused as to which VLAN of multiple VLANs of different types should be identified for transmission of a received communication. Consequently, the switch will be confused as to which VLAN header should be added to the communication.

Overlap can cause a degree of uncertainty as to which of the users in a system of multiple VLANs may be able to communicate with each other and which users cannot communicate with each other. More critically, because of overlap, the goal of the network manager in configuring these VLANs may not be realized. Specifically, certain parts of the network which should be able to communicate with each other may not be able to do so, while other parts of the network which were not intended to be allowed to communicate with each other may be able to do so.

For example, in the FIG. 6 VLAN configurations, when switch 275 receives a communication with a protocol identifier for protocol P1 from LAN 235, it could choose to classify the communication in either VLAN 800, 1000, or 1100 because 235 will be programmed to consider the port, the protocol, and the port and protocol jointly. Similarly, when switch 280 receives a communication with a protocol identifier for protocol P1 from the system user at address Q on LAN 245, it may choose to classify it in either VLAN 900, 1000, 1100, or 1200 because switch 280 will be programmed to consider the address, the protocol, the port and protocol jointly, and the address and protocol jointly. Whatever choice is made by switch 275 and 280 in the scenarios described above will limit connectivity of attached system users in different ways. Therefore, these areas of overlap must be resolved in a deterministic manner, and in the same way by each switch, in order to have meaningful configurations and communications capability.

Accordingly, a need exists for a VLAN system that is capable of configuring various types of VLANs while ensuring that communications received from areas of VLAN overlap are clearly associated, tagged, and transmitted with the proper VLAN tag resulting in system behavior that is predictable and is in accordance with the expectations of network connectivity at the time of configuration of these VLANs.

SUMMARY OF THE INVENTION

Accordingly, the present invention provides rules of precedence for directing communications within different types of VLANs, in order to provide for predictable and desirable network behavior when there are areas of the network in which there is overlap in VLAN configurations, and to allow conflict resolutions by switches in the VLAN system.

Advantageously, switches are provided that route communications to addressees, within a VLAN system capable of configuring multiple types of VLANs, based upon predefined rules of precedence.

Advantageously, switches route communications to addressees, within a VLAN system capable of configuring multiple types of VLANs, in a secure manner. Physical security is ensured by giving a higher precedence to port-based VLAN classifications than to other types of VLAN classifications.

In accordance with the present invention, a switch is provided for use in a virtual communications system having multiple local area networks interconnected by multiple switches so as to be configurable into different types of virtual local area networks. The different types of virtual local area networks may include, for example, port-based networks, address-based networks, protocol-based networks, port and protocol-based networks, and address and protocol-based networks. The switch is preferably a multi-ported reconfigurable switch and includes a first communications port, e.g. an access port, connected directly to a local area network and a second communications port, e.g. a trunk port, interconnected with other system switches typically via a backbone LAN or trunk. A switch control detects a communication from the local area network at the first port and identifies a virtual local area network over which the communication is to be transmitted based upon rules of precedence for different types of virtual local area networks. The rules of precedence preferably provide (I) the port and protocol-based virtual networks precedence over the port-based virtual networks, (ii) the port-based virtual networks precedence over the address and protocol-based virtual networks, (iii) the address and protocol-based virtual networks precedence over the address-based virtual networks, and (iv) the address-based virtual networks precedence over the protocol-based virtual networks.

Typically, the communication will include at least a source address and a protocol identifier, which the switch control detects, along with the port at which the communication is received, to identify the VLAN. After the VLAN has been identified, the switch control adds a VLAN tag representing the identified VLAN to form a VLAN communication. The switch control then directs the VLAN communication to the second communication port for transmission over the identified virtual local area network.

In accordance with other aspects of the invention, a virtual communications system can be implemented using multiple switches of the type described above. A network manager, interconnected to the multiple switches, is capable of configuring virtual local area networks of differing types a described above.

BRIEF DESCRIPTION OF DRAWINGS

These and many other advantages of the present invention will be readily appreciated as the same becomes better understood by reference to the accompanying drawings, in which like reference numerals designate like or corresponding parts throughout, wherein:

FIG. 11 depicts the order of precedence in accordance with the present invention.

DETAILED DESCRIPTION

Figure 7:
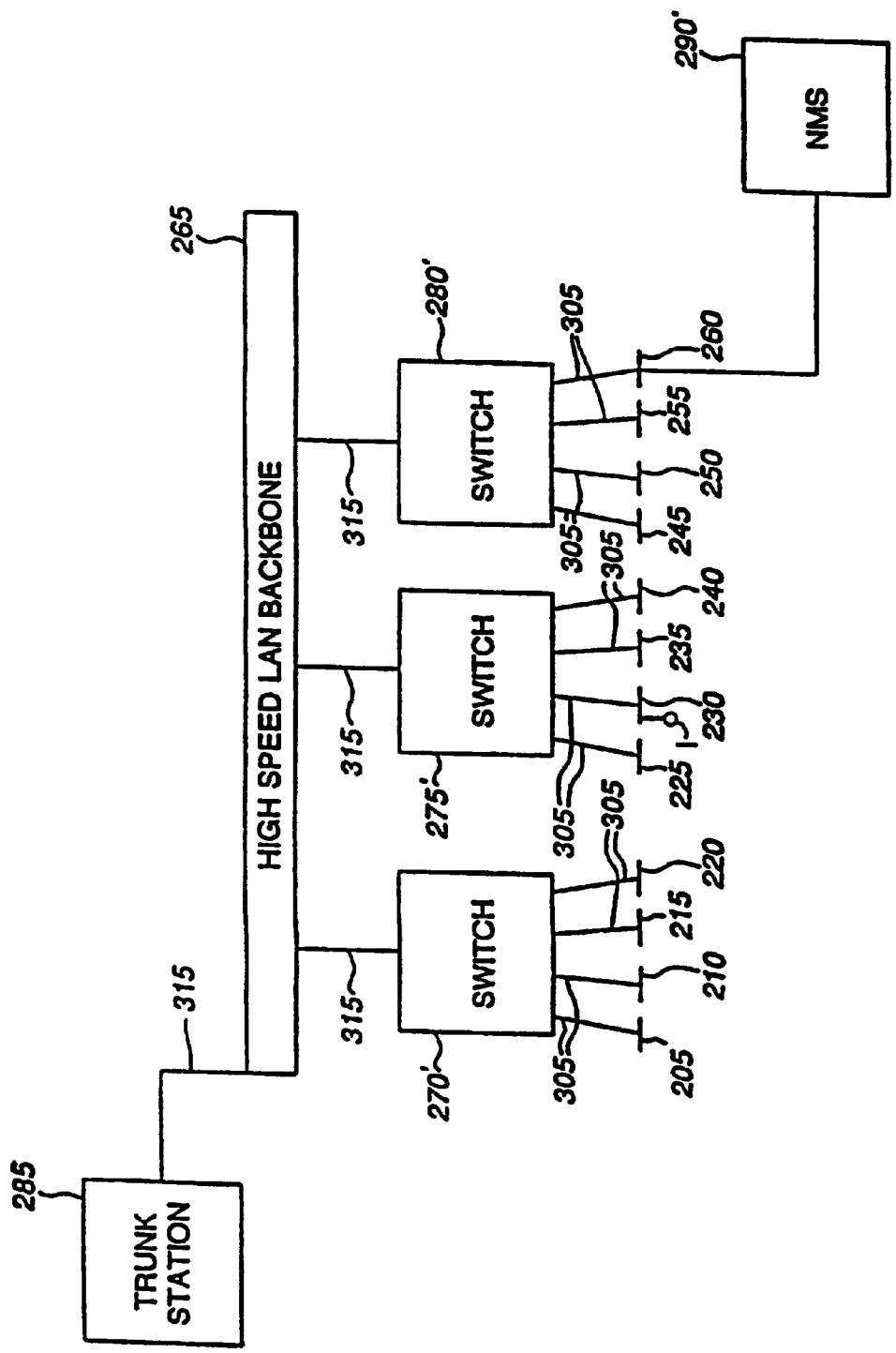
FIG. 7 depicts a VLAN system in accordance with the present invention.

FIG. 7 depicts a virtual communications system or network in accordance with the present invention. The network includes multiple Local Area Networks (LANs) 205–260 interconnected by multiple multi-ported reconfigurable switches 270', 275' and 280' all of which are connected by a high speed backbone LAN 265, often referred to as the trunk. Each LAN, other than the backbone LAN 265 is connected to one of the switches 270', 275' or 280' by an access port 305, while the backbone LAN 265 is connected to each switch by a trunk port 315. A network management station (NMS) 290', which may be a workstation having network management software loaded thereon, manages the network by configuring the network via the switches 270', 275' and 280' to form one or more virtual local area networks (VLANs). A trunk station 285 is connected to the backbone LAN 265 via a trunk port 315. The trunk stations 285 may, for example, be a network server or other network resource to which some or all of the members of the LANs 205–260 may require high speed access from time to time or on a continuous basis as is known in the art. Each of the switches 270', 275' and 280' is capable of linking, via the backbone LAN 265, members of each of the LANs 205–260 to members of the one or more other LANs within the VLANs configured by the NMS 290'.

Figure 8:
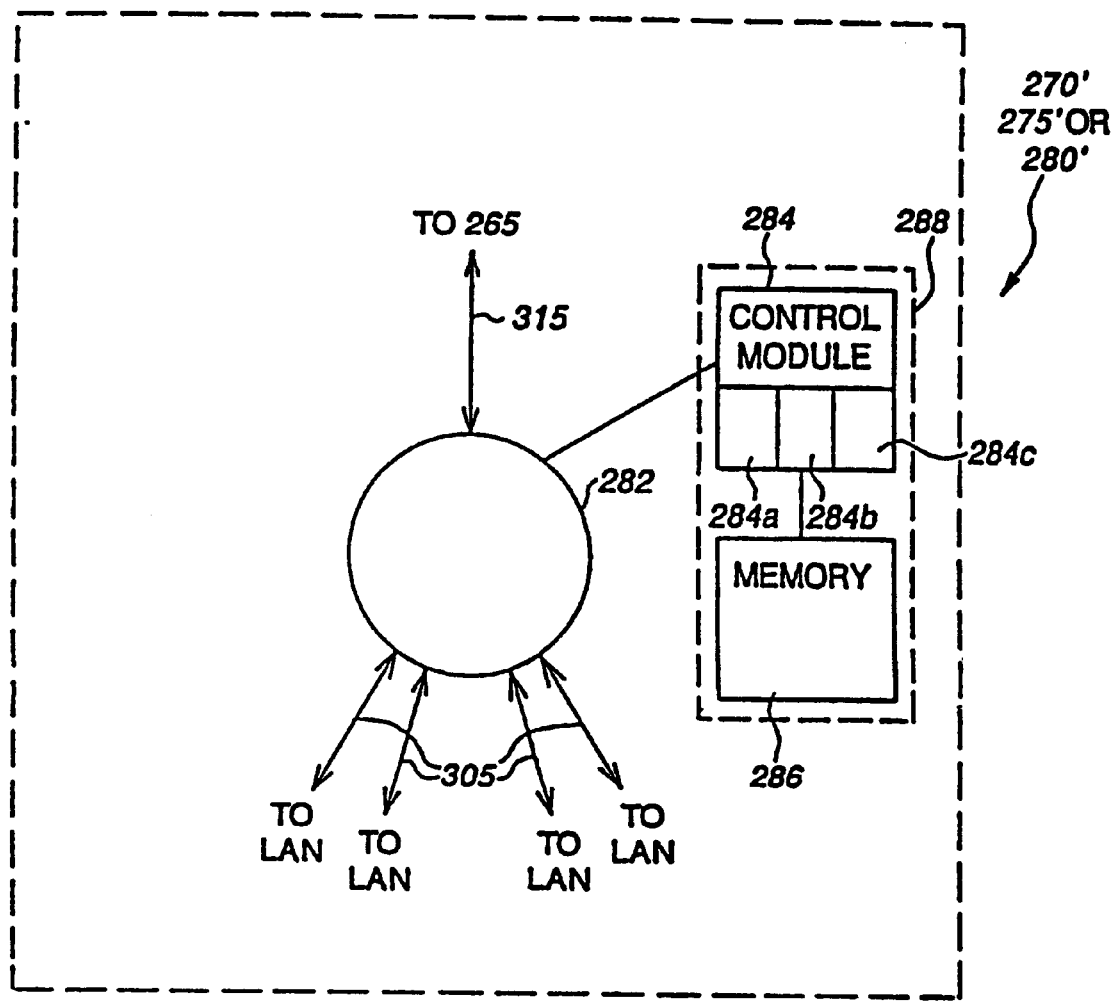
FIG. 8 depicts a switch which can be utilized in the VLAN system depicted in FIG. 7 in accordance with the present invention.

As shown in FIG. 8, each of the switches 270', 275' and 280' includes a control console 288 having a control module 284 and a memory 286 for storing and processing control and VLAN configuration instructions. This data may be initially programmed into the switch or transmitted to the switch by the NMS 290'. The control module 284 includes a controller 284a to control the switching device 282. A detector 284b detects a communication packet received from the backbone 265 via a trunk port 315 or from a LAN directly connected to the switch via an access port 305.

Figure 1:
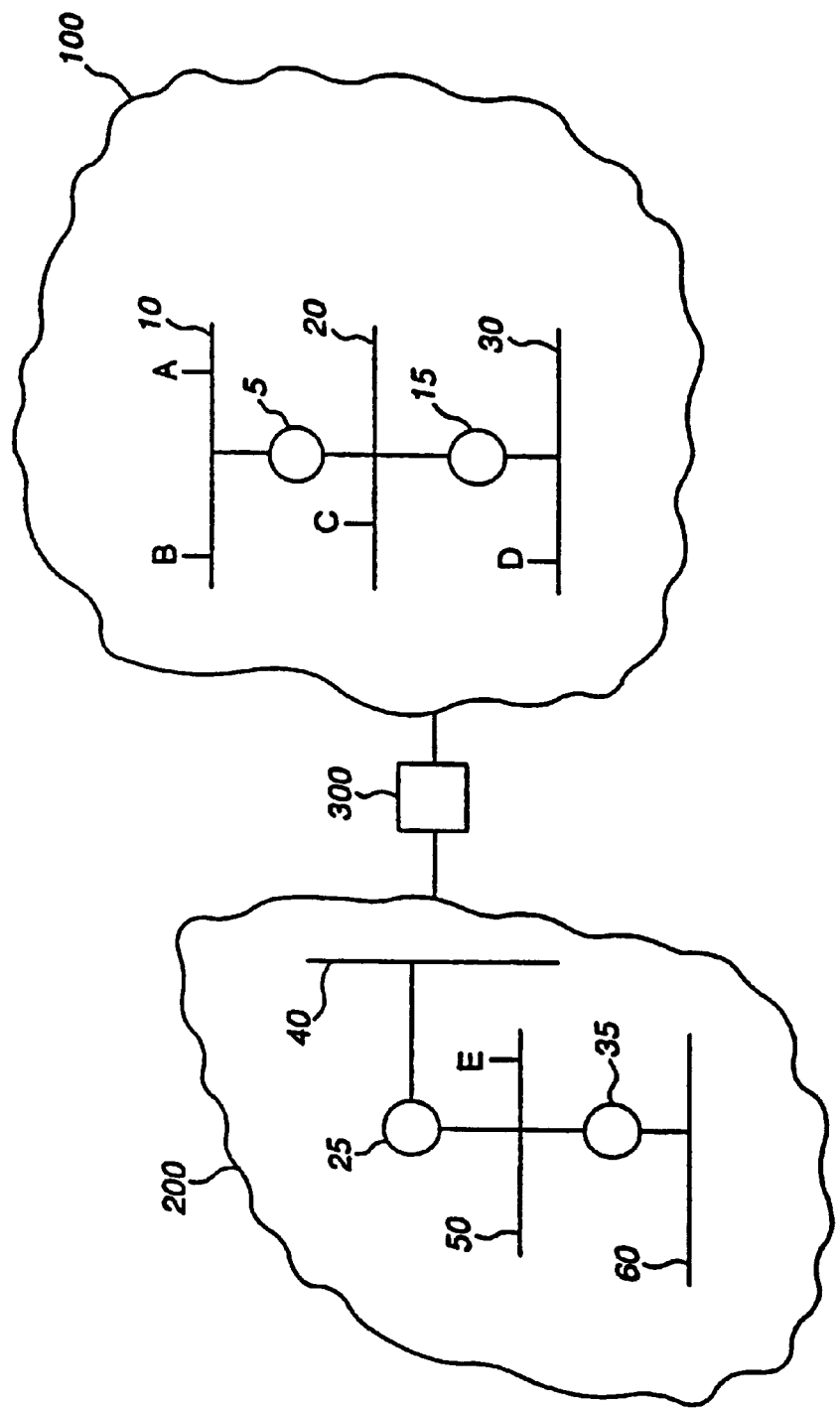
FIG. 1 depicts a known LAN configuration.
Figure 2:
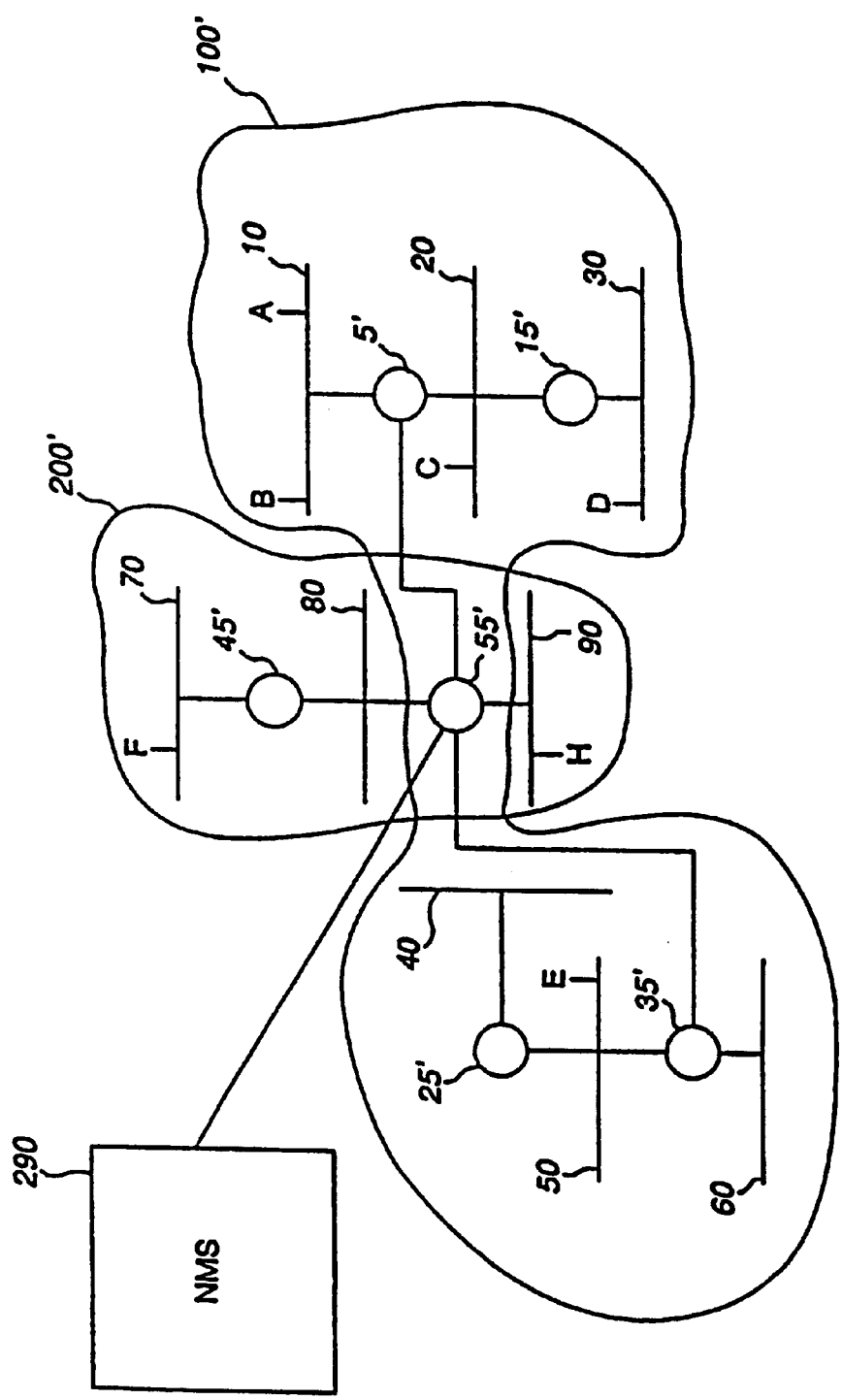
FIG. 2 depicts a known VLAN configuration.
Figure 3:
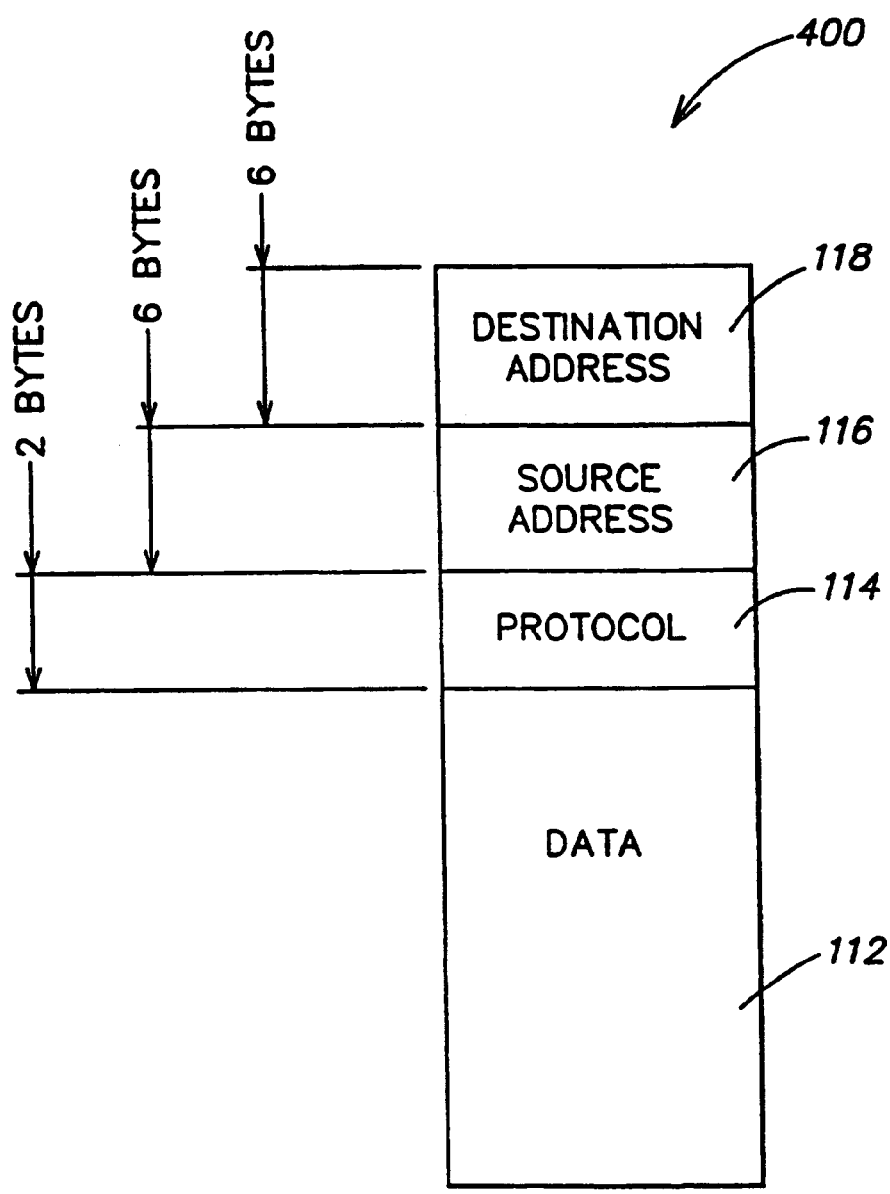
FIG. 3 depicts a conventional LAN message packet.
Figure 4:
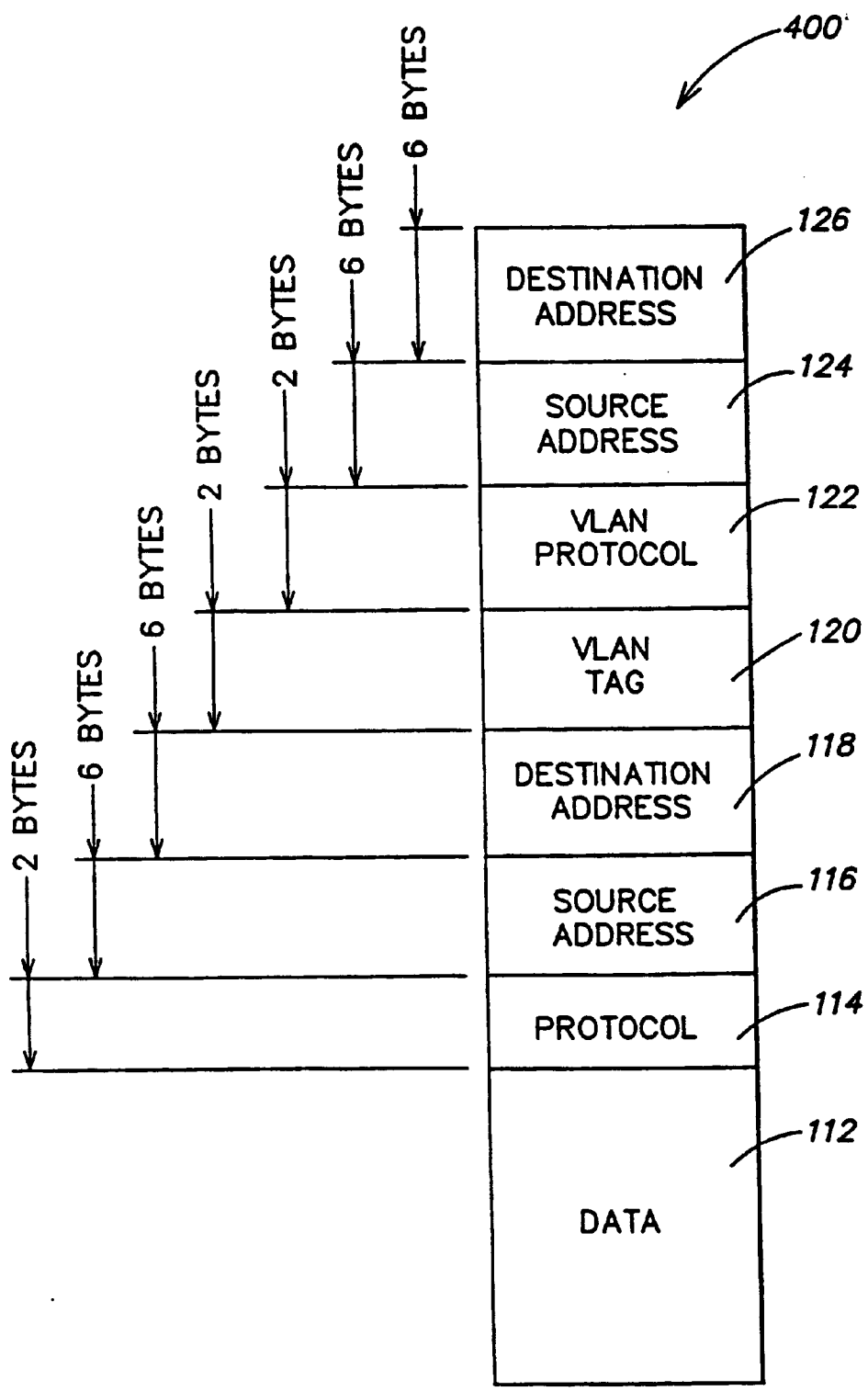
FIG. 4 depicts a conventional VLAN message packet.
Figure 5:
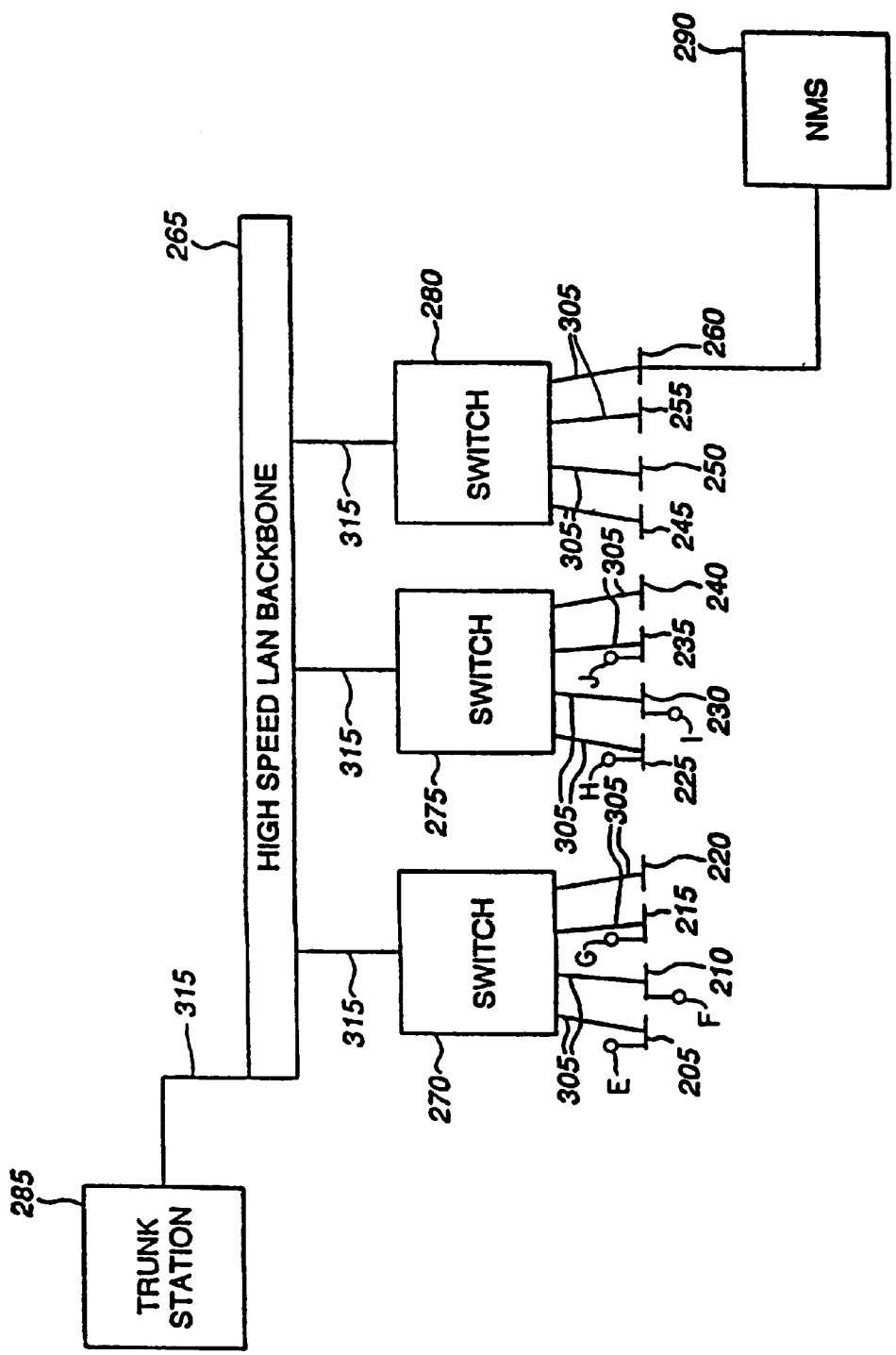
FIG. 5 depicts a schematic diagram of a conventional VLAN system.
Figure 6:
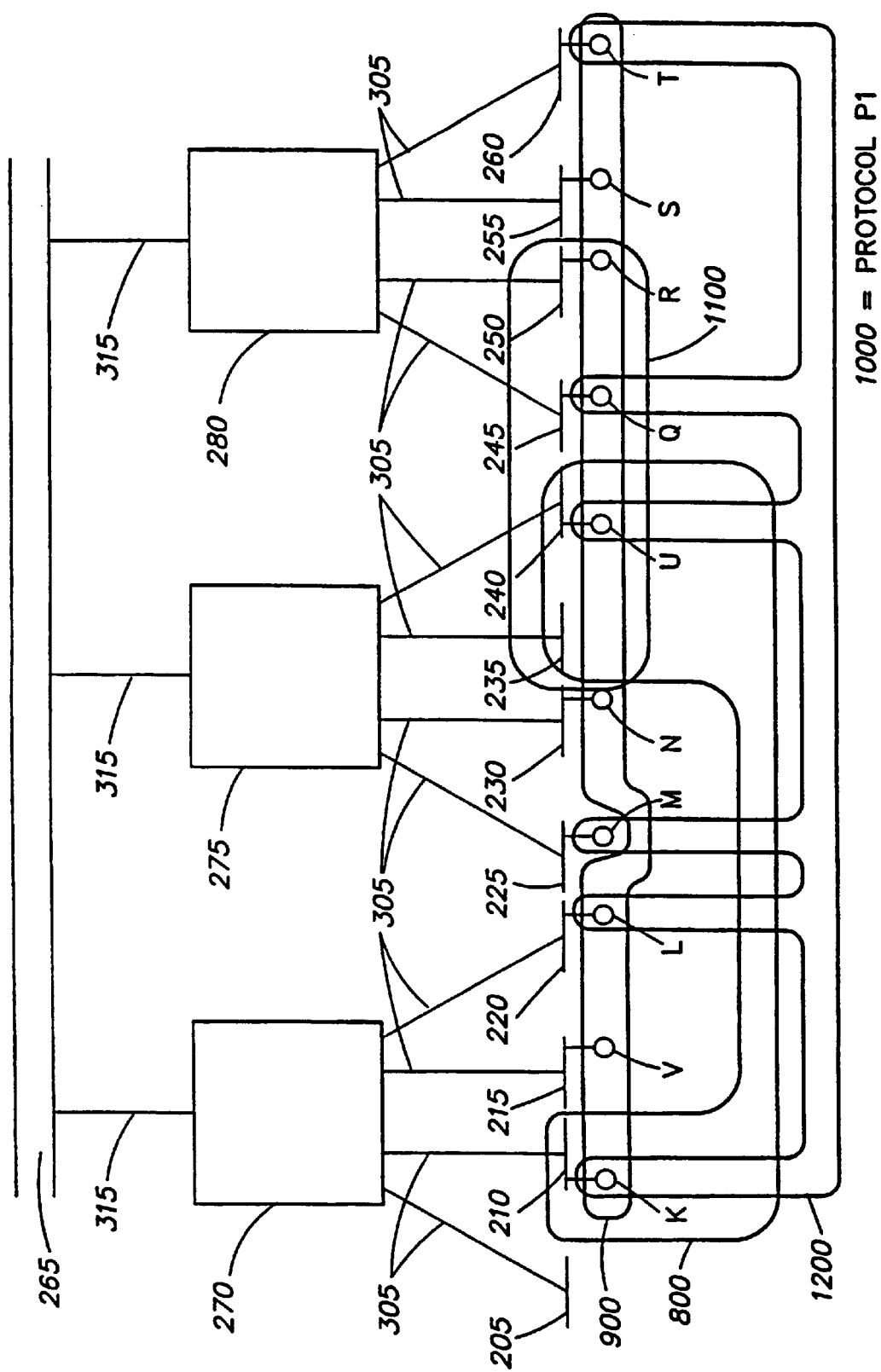
FIG. 6 depicts different types of VLANs conventionally configured from the LANs shown in FIG. 5.

Communications from the backbone 265 may or may not include a VLAN header of the type previously described with reference to FIG. 4. For example, communications from a system user which is a member of the default group will not be tagged with a VLAN header by a switch connected via an access port 305 to the LAN on which the system user resides. As described above, the default group is a group of system users not within any VLAN. With reference to FIG. 6, a system user within the default group would be a system user that is not part of port-based VLAN 800, address-based VLAN 900, protocol-based VLAN 1000, port and protocol-based VLAN 1100, or address and protocol-based VLAN 1200. For example, a system user that resides on VLAN 205 and who sends a communication packet with a protocol other than P1 would be a member of the default group. Thus, if a system user is in the default group, communications from this system user to system users of other LANs will not be tagged.

For the network depicted in FIG. 8, communications from NMS 290' are detected differently. The detectors 284b of switches 270' and 275' detect communications from NMS 290' via the backbone LAN 265 at a trunk port 315, while the detector 284b of switch 280' detects communications from the NMS 290' at the access port 305 connected to LAN 260.

The detector 284b of a switch detects all communications over the backbone LAN 265, which the control module 284 handles in the following manner. If a detected communication is deliverable to a network addressee on any of the LANs connected to an access port of the applicable switch, the controller 284a of the applicable switch controls the switching device 282 to transmit the communication from the trunk port 315 to the applicable access port 305. More specifically, if the detected communication is properly addressed to the addressee and forwarded from an authorized member of the system, the controller 284a of the applicable switch controls the switching device 282 to transmit the message to the applicable LAN. An authorized member is a member of the VLAN that includes the addressee. In the case where the addressee is a member of the default group, however, an authorized member is any other member of the system because the member is not a member of any VLAN.

The control module 284 also includes a tagger 284c for tagging communications received via an access port 305 for transmission from one member to another member of a configured VLAN by adding a VLAN header thereto. The tagger 284c also removes the VLAN header from a communication received from the switch's trunk port 315 that is to be forwarded to a member of a LAN connected to the switch by an access port. More particularly, the tagger 284c discards the tag by removing the VLAN header from the communication, prior to the communication being transmitted to the appropriate output port 305, i.e., prior to the controller 284a controlling the switching device 282 to transmit the communication from the trunk port 315 to the access port 305.

If the detected communication has been received via an access port 305 of the switch and is properly addressed and deliverable to a network addressee on any of the other LANs connected to the switch, the controller 284a of the switch controls the switching device 282 to transmit the message from the input access port 305 to the applicable output access port 305. In such a case, where the sender and addressee are each members of a LAN connected to the same switch, there is no need to add a VLAN header to the communication before directing it to output port 305. However, if such a communication is to be multicast transmitted to one or more LANs within the applicable VLAN that are directly connected to other switches by access ports, the communication output from the trunk port 315 of the applicable switch will, of course, be tagged by the tagger before transmission via the trunk 265 as discussed above.

Accordingly, all communications between LANs within configured VLANs are forwarded to the appropriate addressee LAN. This is accomplished by identifying communications between LANs within configured VLANs and tagging the communications, except for those between LANs connected by an access port to the same switch, with a VLAN header.

The NMS 290' is capable of configuring VLANs of differing types. More particularly, the NMS 290' can configure or define VLANs which are port-based, address-based, protocol-based, port and protocol-based, and address and protocol-based. The NMS 290' instructs the switches 270'-280' as to the configurations of the different types of VLANs. Each of the switches 270'-280' is programmed to consider the applicable characteristics of each communication received, via an access port, in order to determine the appropriate VLAN tag to add to the communication before transmission via the trunk port 315 to the high speed LAN backbone or trunk 265. These instructions may be stored in the memory 286 of the switch, as depicted in FIG. 8, and utilized by the switch control module 284 in determining which tag to add to a communication received at an access port 305.

Each of the switches 270'-280' is programmed to utilize an order of precedence to identify with certainty the appropriate VLAN for transmission of the received communication. More particularly, each of the switches 270'-280' is programmed so as to operate to tag the communication with the VLAN header, i.e., the VLAN tag, representing the VLAN which is port and protocol-based over any other VLAN. Hence, if a communication received from one of the LANs is identified as potentially associated with a port and protocol-based or other type of VLAN, the switch will give precedence to the port and protocol-based VLAN over the other possible associated VLANs.

Figure 9:
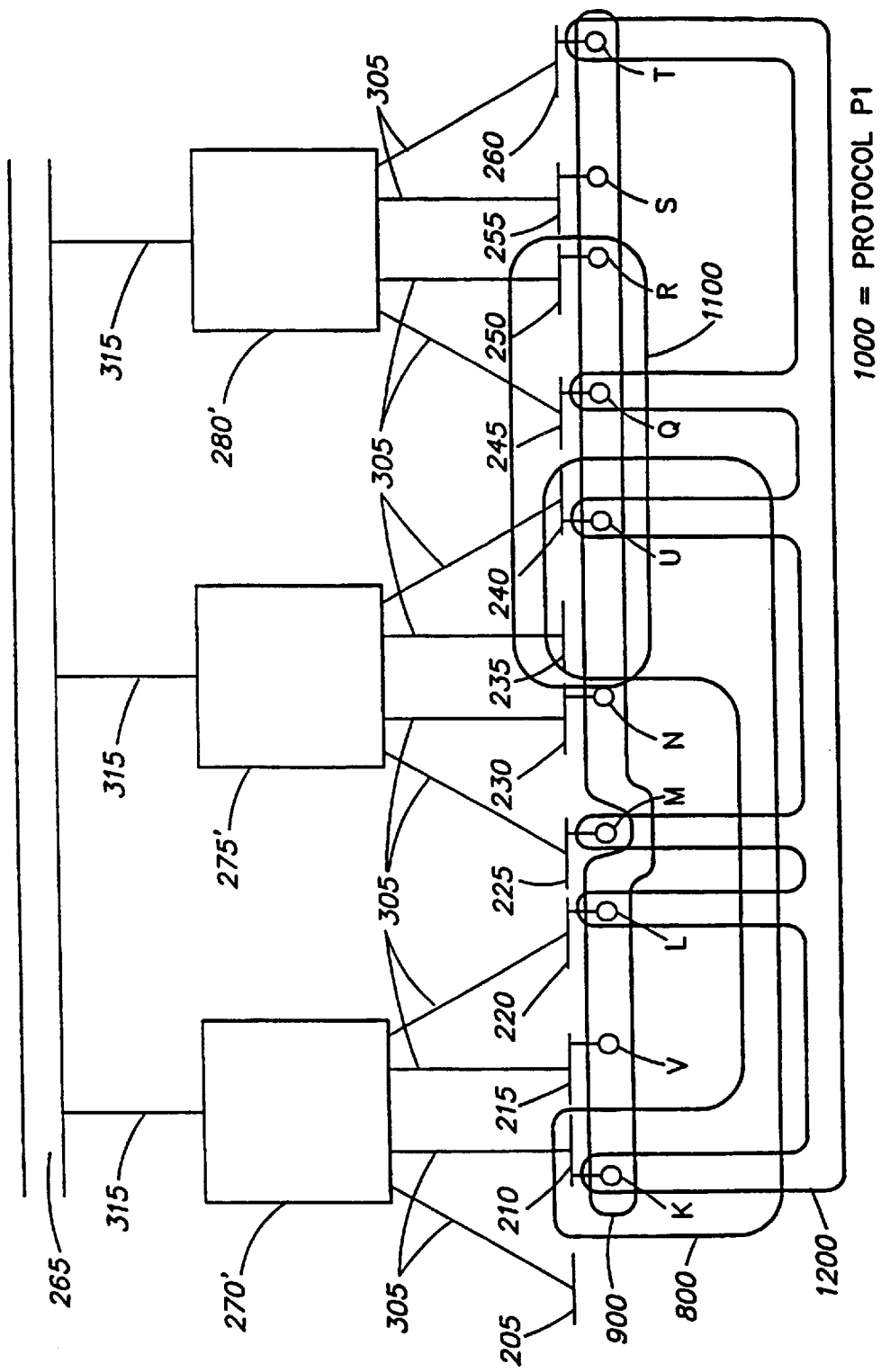
FIG. 9 depicts the LANs shown in FIG. 7 configured into different types of VLANs in accordance with the present invention.

For example, referring to FIG. 9, if the switch 280' receives a communication with a protocol identifier for protocol P1 from a user on LAN 250, the switch identifies the communication as being associated with both a port and protocol-based and protocol-based VLAN. The switch 280', in accordance with the order of precedence established by its programmed instructions, will identify the communication as being associated with the port and protocol-based VLAN 1100, rather than with the protocol-based VLAN 1000, and will, accordingly, tag the communication with a VLAN header representing VLAN 1100.

Each of the switches 270'-280' is further programmed to give precedence to an identification of a possible association with a port-based VLAN over all other types of VLANs except port and protocol-based VLANs. For example, if switch 270' receives a communication at an access port 305 from LAN 215 that includes a source address within address-based VLAN 900, e.g., address V, the switch 270' will give precedence to the fact that the communication was received at a port 305 configured within port-based VLAN 800 and will tag the communication with a VLAN header representing VLAN 800 rather than VLAN 900. It will be recognized by those skilled in the art that establishing port and protocol-based VLANs, as well as just port-based VLANs, at the highest levels within the order of precedence not only ensures that the communication is transmitted via the correct VLAN, but also enhances security because protocol-based and address-based VLANs are inherently less secure than port-based VLANs.

The switches 270'-280' are further programmed such that address and protocol-based VLANs are given precedence over address-based VLANs and protocol-based VLANs. For example, if switch 280' receives a communication at an access port 305 from a system user at address T of LAN 260, and the communication has an identified protocol corresponding to the protocol associated with protocol-based LAN 1000, P1, the switch 280' will prioritize and give precedence to the correspondence of the communication to the address and protocol-based VLAN 1200 over address-based VLAN 900 and protocol-based VLAN 1000. Accordingly, switch 280' will tag the communication with the VLAN header representing VLAN 1200.

Finally, address-based VLANs are given priority or precedence over the protocol-based VLANs. In this regard, if switch 275' receives a communication at an access port 305 from a system user at address N on LAN 230, which includes a protocol identifier corresponding to the protocol on which protocol-based VLAN 1000 is configured, P1, the switch 275' will identify the appropriate VLAN as the address-based VLAN 900 rather than protocol-based VLAN 1000 and will tag the communication accordingly. The levels of precedence are shown in FIG. 11.

Figure 10:
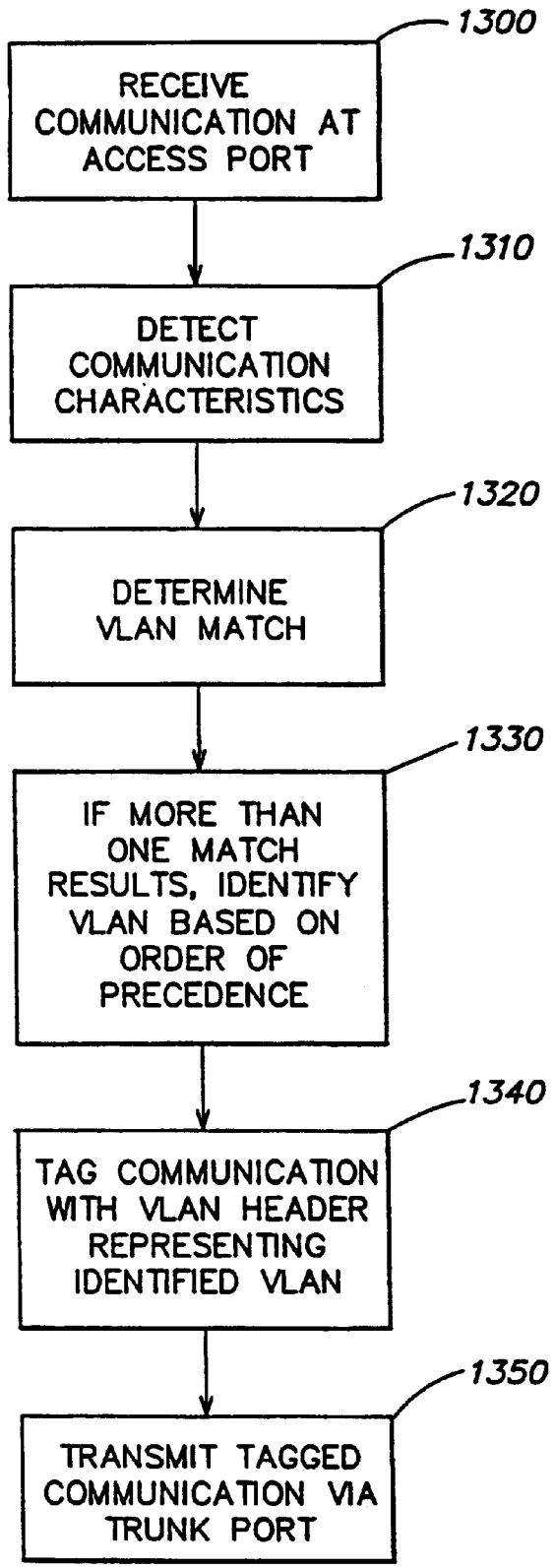
FIG. 10 is a flow chart of the steps performed by the switch depicted in FIG. 8 in accordance with the present invention.

FIG. 10 summarizes the steps performed at each switch 270'-280' to correctly identify the appropriate VLAN for tagging a communication received from a LAN connected directly thereto by access port 305. As indicated in FIG. 10, in step 1300, the switch receives a communication, typically in the form of a packet, at an access port 305. In step 1310 the communication characteristics are detected by the detector 284b of the control module 288. These characteristics include the receive port, source address, and protocol and be determined in step 1310.

In step 1320, the control module 288, in accordance with the programmed instructions stored in the memory 286, determines one or more VLAN matches, i.e. determines one or more VLANs with which the communication may be appropriately associated. Depending on the instruction, this determination may be based upon the receive port and protocol considered jointly, the receive port, the source address and protocol considered jointly, the address, and the protocol.

In step 1330, in the case of more than one VLAN match, the applicable switch 270'-280' identifies which of the VLAN type matches has the highest priority based upon the order of precedence described above, i.e., port and protocol-based over port-based, port-based over address and protocol-based, address and protocol-based over address-based, and address-based over protocol-based, as shown in FIG. 11.

In step 1340, the communication is tagged with the VLAN header representing the highest priority identified VLAN. In step 1350, the tagged communication is transmitted via the trunk port 315 from the switch and from there forwarded to the appropriate addressee or addressees in the conventional manner.

For example, referring to FIG. 9, the following steps would be performed at switch 275' when a system user at address U on LAN 240 transmits a communication packet with a protocol identifier for P1 addressed to a system user at address L on LAN 220, and the system is programmed to identify packets with a protocol identifier for protocol P1 with protocol-based VLAN 1000. First, switch 275' receives the packet at an access port 305. Second, detector 284b of the control module 288 of switch 275' detects the receive port, the source address U of the packet, and the protocol identifier for P1 of the packet. Third, the control module 288 of switch 275', in accordance with the programmed instructions stored on the memory 286, determines five VLAN matches. Specifically, the control module determines that the packet may be appropriately associated with port-based VLAN 800 because the receive port at which LAN 240 is connected is a member of VLAN 800, the packet may be appropriately associated with address-based VLAN 900 because the source address U is a member of VLAN 900, the packet may be appropriately associated with protocol-based VLAN 1000 because the protocol identifier of the packet is for P1, the packet may be appropriately associated with port and protocol-based VLAN 1100 because the receive port at which LAN 240 is connected is a member of VLAN 1100 when the protocol identifier of the packet is for P1, and the packet may be appropriately associated with address and protocol-based VLAN 1200 because the source address U is a member of VLAN 1200 when the protocol identifier of the packet is for P1.

Fourth, based upon the order of precedence as shown in FIG. 11, control module 288 identifies that port and protocol-based VLAN 1100 has the highest priority over port-based VLAN 800, address and protocol-based VLAN 1200, address-based VLAN 900, and protocol-based VLAN 1000.

Fifth, the tagger 284c of switch 275' tags the packet with the VLAN header representing VLAN 1100. Last, the switch 275' transmits the tagged packet via the trunk port 315 onto the high-speed backbone 265 to be forwarded to system user at address V in the conventional manner.

As described in detail above, the present invention provides rules of precedence for directing communications within different types of VLANs. Switches route communications to addressees, within a VLAN system capable of configuring multiple types of VLANs, based upon the predefined rules of precedence and in a secure manner.

It will also be recognized by those skilled in the art that, while the invention has been described above in terms of a preferred embodiment, it is not limited thereto. For example, a different embodiment can be realized with a modified order of the described rules of precedence. Various features and aspects of the above described invention may be used individually or jointly. Further, although the invention has been described in the context of its implementation in a particular environment and for particular purposes, those skilled in the art will recognize that its usefulness is not limited thereto and that the present invention can be beneficially utilized in any number of environments and implementations. Accordingly, the claims set forth below should be construed in view of the full breadth and spirit of the invention as disclosed herein.

What is claimed is:

1. A method of selecting a VLAN from among a plurality of VLANs to assign to a packet received at a network device of a communications network, wherein each VLAN has membership criteria based on one or more aspects of the communications network and each VLAN has a VLAN classification based on its membership criteria, the method comprising acts of:

(A) determining one or more characteristics associated with the packet received at a first port of the network device, the one or more characteristics including the first port;

(B) determining one or more VLANs having membership criteria satisfied by the determined characteristics, a first of the determined VLANs having a first VLAN classification based on membership criteria that includes network device ports;

(C) if more than one VLAN is determined, selecting the first determined VLAN based on a precedence order of VLAN classifications, the precedence order specifying that the first VLAN classification has precedence over other VLAN classifications; and (D) assigning the first determined VLAN to the received packet.

2. The method of claim 1, wherein the network device is a switch.

3. The method of claim 1, wherein the precedence order specifies that the first VLAN classification has a highest precedence over all other VLAN classifications.

4. The method of claim 3, wherein the network device is a switch.

5. The method of claim 1, wherein the first VLAN classification is a port-based VLAN classification.

6. The method of claim 5, wherein the precedence order specifies that the first VLAN classification has a highest precedence over all other VLAN classifications.

7. The method of claim 5, wherein the network device is a switch.

8. The method of claim 5, wherein another of the plurality of determined VLANs has at least one of the following VLAN classifications: address-and-protocol-based, address-based, and protocol-based.

9. The method of claim 1, wherein the first VLAN classification is a port-and-protocol-based VLAN classification.

10. The method of claim 9, wherein the precedence order specifies that the first VLAN classification has a highest precedence over all other VLAN classifications.

11. The method of claim 9, wherein the network device is a switch.

12. The method of claim 9, wherein another of the plurality of determined VLANs has at least one of the following VLAN classifications: port-based, address-and-protocol-based, address-based, and protocol-based.

13. A system for selecting a VLAN from among a plurality of VLANs to assign to a packet received at a network device of a communications network, wherein each VLAN has membership criteria based on one or more aspects of the communications network and each VLAN has a VLAN classification based on its membership criteria, the system comprising:

a control module to determine one or more characteristics associated with the packet received at a first port of the network device, the one or more characteristics including the first port, to determine one or more VLANs having membership criteria satisfied by the determined characteristics, a first of the determined VLANs having a first VLAN classification based on membership criteria that includes network device ports, to select the first determined VLAN, if more than one VLAN is determined, based on a precedence order of VLAN classifications, the precedence order specifying that the first VLAN classification has precedence over other VLAN classifications, and to assign the first determined VLAN to the received packet.

14. The system of claim 13, wherein the network device is a switch.

15. The system of claim 13, wherein the precedence order specifies that the first VLAN classification has a highest precedence over all other VLAN classifications.

16. The system of claim 15, wherein the network device is a switch.

17. The system of claim 13, wherein the first VLAN classification is a port-based VLAN classification.

18. The system of claim 17, wherein the precedence order specifies that the first VLAN classification has a highest precedence over all other VLAN classifications.

19. The system of claim 17, wherein the network device is a switch.

20. The system of claim 17, wherein another of the plurality of determined VLANs has at least one of the following VLAN classifications: address-and-protocol-based, address-based, and protocol-based.

21. The system of claim 13, wherein the first VLAN classification is a port-and-protocol-based VLAN classification.

22. The system of claim 21, wherein the precedence order specifies that the first VLAN classification has a highest precedence over all other VLAN classifications.

23. The system of claim 21, wherein the network device is a switch.

24. The system of claim 21, wherein another of the plurality of determined VLANs has at least one of the following VLAN classifications: port-based, address-and-protocol-based, address-based, and protocol-based.

25. A system for selecting a VLAN from among a plurality of VLANs to assign to a packet received at a network device of a communications network, wherein each VLAN has membership criteria based on one or more aspects of the communications network and each VLAN has a VLAN classification based on its membership criteria, the system comprising:

a control module to determine one or more characteristics associated with the packet received at a first port of the network device, the one or more characteristics including the first port, to determine one or more VLANs having membership criteria satisfied by the determined characteristics, a first of the determined VLANs having a first VLAN classification based on membership criteria that includes network device ports, and to assign the first determined VLAN to the received packet; and means for selecting, in the event that more than on VLAN is determined, the first determined VLAN based on a precedence order of VLAN classifications, the precedence order specifying that the first VLAN classification has precedence over other VLAN classifications.

26. The system of claim 25, wherein the network device is a switch.

27. The system of claim 25, wherein the precedence order specifies that the first VLAN classification has a highest precedence over all other VLAN classifications.

28. The system of claim 27, wherein the network device is a switch.

29. The system of claim 25, wherein the first VLAN classification is a port-based VLAN classification.

30. The system of claim 29, wherein the precedence order specifies that the first VLAN classification has a highest precedence over all other VLAN classifications.

31. The system of claim 29, wherein the network device is a switch.

32. The system of claim 29, wherein another of the plurality of determined VLANs has at least one of the following VLAN classifications: address-and-protocol-based, address-based, and protocol-based.

33. The system of claim 25, wherein the first VLAN classification is a port-and-protocol-based VLAN classification.

34. The system of claim 33, wherein the precedence order specifies that the first VLAN classification has a highest precedence over all other VLAN classifications.

35. The system of claim 33, wherein the network device is a switch.

36. The system of claim 33, wherein another of the plurality of determined VLANs has at least one of the following VLAN classifications: port-based, address-and-protocol-based, address-based, and protocol-based.

* * * * *